United States Patent Office 3,244,571
Patented Apr. 5, 1966

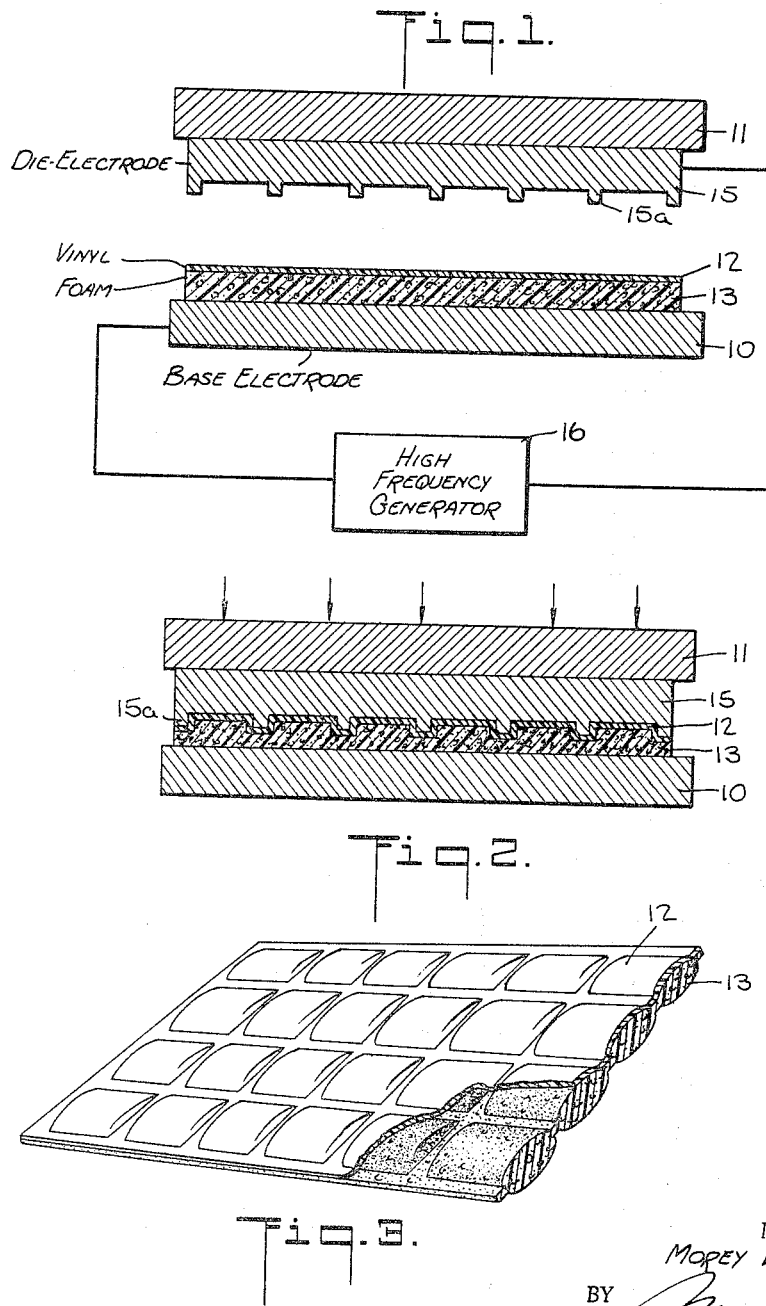

3,244,571
PROCESS FOR DIELECTRICALLY EMBOSSING POLYURETHANE FOAM ASSEMBLIES
Morey Weisman, 147—23 Charter Road, Jamaica, N.Y.
Filed May 2, 1963, Ser. No. 277,552
10 Claims. (Cl. 156—196)

This invention relates generally to a technique for dielectrically heating and embossing decorative articles formed of dissimilar materials, and more particularly to a method for making an embossed article including a supported or unsupported thermoplastic film heat-sealed to a layer of polyurethane foam, and to improved products fabricated thereby.

In dielectric heating techniques, the material to be processed is pressed between two electrodes across which a high-frequency voltage, in the frequency range of 2 to 200 megacycles, is applied to generate heat within the material. For dielectric embossing, the surface of one of the electrode is contoured with the design to be imparted to the material. This process may be used to manufacture decoratively embossed automotive upholstery in which a trim material, such as vinyl resin film, is placed over a flexible foam plastic pad having a fabric or fiberboard backing. Upon operation of the dielectric press, an embossed pattern is produced in the laminated article, in which the trim material is fused to the backing through the foam plastic pad, the plastic in the pad having been melted and cured along the embossing lines.

The flexible foam pad in the embossed article provides a cushioning and shock-absorbing effect, and it is possible by this technique to produce seat covers, floor mats and wall panels of various kinds, and many other cushioned and embossed products having an attractive trim. In the commercial manufacture of articles of the type wherein the heat-seal seam joining the laminations also completely defines the contour of the article, it is possible to so construct the shaped electrode as to form along the heat-seal lines a tear line permitting ready stripping of the waste material from the completed article. This does away with the need for a subsequent cutting operation and leaves a well defined edge on the article. Tear sealing is however only feasible with unsupported thermoplastic filament sheeting.

Heretofore, products of the above-described type have been made by heat-sealing a sheet or pad of vinyl foam to a sheet of unsupported vinyl resin film, the film serves as the facing or trim material. It will be noted that such combinations of vinyl resin film and vinyl foam material have similar chemical and dielectric characteristics. However, it has not hitherto been feasible commercially, using conventional dielectric heating equipment, to laminate together such dissimilar materials as a vinyl resin film with a polymer foam of flexible character, such as isocyanate resin foam or polyurethane foam. Among the advantages of polyurethane foam over vinyl and other forms of flexible foam, are that polyurethane foam has superior insulating properties and a more uniform cell structure. Moreover, not only is polyurethane foam much lighter than vinyl foam, which is an important factor in transportation costs, but it is a much more economical material.

The reason why it has been difficult to laminate together dissimilar materials by dielectric heating is that the dissimilar materials when subjected to a high-frequency field will not respond to the same extent, for the heat developed in each material depends not only on the amplitude and frequency of the applied voltage, but also on the specific dielectric constant and power factor of each material, as well as the dielectric strength thereof.

In attempting to dielectrically emboss a combination of vinyl resin film and ordinary polyurethane foam with conventional techniques, the disparate characteristics of these materials result in burning of the vinyl when the voltages are adjusted sufficiently to heat the foam. On the other hand, when the voltage is appropriate to the film, it is insufficient to heat the foam. The softening point of vinyl resin film is about 200° F., whereas that of polyurethane foam is in the order of 400° F. to 500° F. Hence, in adjusting a dielectric heater to vinyl, it will be maladjusted to the foam, and vice versa.

Accordingly, it is the principal object of the invention to provide an efficient and inexpensive technique for dielectrically embossing a trim assembly including a layer of polyurethane foam and one or more layers of other materials whose dielectric properties are at variance with that of the foam.

More specifically, it is an object of the invention to provide a method of the above-described type for dielectrically embossing a trim assembly including a supported or unsupported vinyl resin film and a layer of polyurethane foam, wherein the foam is pre-treated to have dielectric heating properties similar to those of vinyl.

Also an object of the invention is to produce by a technique of the above-noted type, articles having improved cushioning, shock-absorbing, insulating and drag characteristics.

A significant feature of the invention resides in the fact that it renders possible the production of articles having polyurethane layers therein, by existing dielectric heating and die equipment, and thereby satisfies market requirements for a simple, inexpensive and rapid method for embossing or texturizing polyurethane foam products.

Briefly stated, these objects are accomplished by the dielectric heating under pressure of a trim assembly including a polyurethane foam layer and one or more layers of dielectrically dissimilar material, the foam layer having impurities uniformly dispersed therein which serve to alter the dielectric characteristics of the foam layer to an extent whereby the foam and the other materials respond to common electric field conditions to effect fusion therebetween.

For a better understanding of the invention, as well as other objects and further features thereof, reference is made to the following detailed description to be read in conjunction with the accompanying drawing, wherein:

FIG. 1 shows a trim assembly positoned in a dielectric press preparatory to embossing, the view being in section and being generally schematic;

FIG. 2 is similar to FIG. 1, but as the assembly appears in the dielectric embossing operation; and FIG. 3 shows in perspective the embossed article resulting from the process.

Referring now to FIG. 1, there is shown a dielectric heating press of standard design, including a base platen 10 and a movable head or upper platen 11, the press being arranged to shift the upper platen downwardly. Positioned within the press is a laminated trim assembly constituted by a sheet of trim material 12 positioned on a layer or pad 13 of flexible foam plastic material. The trim may be of unsupported vinyl resin film or a vinyl-coated material, while the pad is of polyurethane foam, pre-treated in accordance with the invention.

By "trim assembly" as this term is used herein, is meant any combination of a layer of polyurethane foam with a decorative top layer of another material, to which may be added a base layer of substrate. For example, the top layer, referred to as the trim layer, may be formed of synthetic or natural fabrics such as those of cotton, wool, rayon, or nylon, which have been coated or sprayed with a suitable polyvinyl chloride latex emulsion. Alternatively, the top layer may consist of a fabric sheet having a separate under-layer of vinyl resin film which when subjected to dielectric heating acts to bond the fabric sheet to the polyurethane foam. The base layer, if one is included, may be of the same flexible material as the top layer or it may be another rigid or flexible material.

The basic process for making flexible polyurethane foam are disclosed in Patent 2,764,565, issued Sept. 25, 1956. Most polyurethane flexible foam is based on diethylene glycoladipic acid polyesters. In accordance with the present invention, intermingled with the liquid foaming mixture are impurities in the form of fine particles 14 of relatively low electrical resistivity, such as graphite, carbon or iron oxide, which do not react with the foaming mixture but are suspended therein, whereby when the mixture is laid down, foamed and cured, the resistive particles are uniformly dispersed throughout the body of flexible foam. Alternatively, polyvinyl chloride may be included in the polyurethane liquid foaming mixture to alter the dielectric properties of the flexible foam produced therefrom.

The trim assembly is positioned on the flat platen 10. Attached to the upper platen 11 is an embossing die 15 of electrically conductive material such as brass, provided with embossing ribs 15a which are set on edge and are thus adapted to impart the desired pattern or design to the trim assembly upon closing of the press and the application of heat and pressure. In the event of tear sealing, the edges of the die are properly chamfered to produce tear lines. Obviously, almost any desired die configuration may be used.

Dielectric heating is effected in the usual manner by a high-frequency generator 16 having a power rating of about 2 to 30 kilowatts or higher in some instances, whose output is connected between the die 15 and the base electrode or platen 10, whereby a high-frequency field is established therebetween which penetrates the trim assembly.

In operation, the die is brought down onto the trim assembly, as shown in FIG. 2, to engage the assembly, the portions under the rib being compressed. The pressure is in the order of 80 to 200 pounds per square inch, the foam under the ribs being sufficiently compressed to flatten the cells thereof. The amount of pressure used depends on the thickness of the assembly and the physical characteristics of the materials therein.

After the press is closed, the high-frequency voltage is applied, preferably in the order of 2000 volts in a frequency range of 2 to 200 megacycles, preferably between 18 to 30 megacycles. As the electric field passes through the vinyl resin film and foam, the dielectric losses produced therein result in a heating action whereby the foam and vinyl under pressure are caused simultaneously to soften and fuse together, the voltage thereafter being cut off to allow cooling and solidification before the pressure is removed, whereby the embossed design is set into the assembly.

The resultant embossed structure is shown in FIG. 3, where it will be seen that the trim sheet and the foam pad thereunder are embossed and bonded together along the embossing lines. In practice, a backing sheet may be used below the flexible foam pad, the sheet being of a flexible material, such as woven cotton or fiber glass, or semi-rigid, such as fiberboard coated with vinyl. Similarly, as pointed out above, the trim sheet may, instead of vinyl, be composed of vinyl-covered flexible fabric or film of other material.

The significant feature of the invention resides in the introduction of a lossy material or impurity dispersed throughout the flexible foam matrix, which material is heated under the influence of the high-frequency field and effectively alters the power factor or other characteristics of the foam so that it more closely matches that of the vinyl trim or other material used in the trim or substrate. The same principle may be used for other trim assemblies in which the materials are otherwise dielectrically mismatched.

There are a great variety of end uses for flexible polyurethane foam products produced in the manner described above. These uses appear in the automotive industry, in upholstering and furniture manufacture, in handbags and luggage, packaging, etc. The polyurethane foam not only provides superior cushioning, shock-absorbing and insulating qualities than vinyl foam, but when its surface is exposed, it affords a high degree of drag or skid resistance. Another important use of foam products made in accordance with the invention lies in the acoustic field where the sound reduction properties of three dimensional texturized or embossed polyurethane structures are highly useful.

While there has been shown a preferred embodiment of my process for dielectrically embossing laminated vinyl and flexible foam, it will be appreciated that many changes and modifications may be made therein without, however, departing from the essential spirit of the invention as defined in the annexed claims.

What is claimed is:

1. The method of heat sealing a trim assembly including a flexible polyurethane foam layer and at least one layer of dielectrically heat-sealable dissimilar material, comprising the steps of intermingling with a liquid foaming polyurethane mixture impurities in an amount to alter the dielectric properties thereof to an extent whereby the foam and the dissimilar material are similarly responsive dielectrically, foaming and curing said mixture to produce a flexible foam layer in which said impurities are dispersed, subjecting the assembly to pressure, and exposing the pressed assembly to a high-frequency electric field to effect dielectric heat sealing.

2. The method as set forth in claim 1, wherein said trim assembly includes a decorative top layer above the foam layer and a base layer thereunder.

3. The method as set forth in claim 2, wherein said top layer is foamed of a fabric coated with a polyvinyl chloride latex emulsion.

4. The method as set forth in claim 2, wherein said top layer consists of a fabric sheet having a separate underlayer of vinyl resin film which when dielectrically heated bonds the fabric sheet to the foam layer.

5. The method as set forth in claim 1, wherein said impurity is polyvinyl chloride.

6. The method as set forth in claim 1, wherein said impurity is carbon.

7. The method as set forth in claim 1, wherein said impurity is graphite.

8. The method as set forth in claim 1, wherein said high-frequency electric field is created by a high-frequency voltage applied to selected areas of said assembly to effect heat-sealing thereof in a desired pattern.

9. The method as set forth in claim 8, wherein said other layer is of vinyl resin film.

10. The method as set forth in claim 8, wherein said voltage is in a frequency range of 18 to 30 megacycles.

References Cited by the Examiner

UNITED STATES PATENTS

| | | |
|---|---|---|
| 2,235,872 | 3/1941 | Ford et al. |
| 2,335,958 | 12/1943 | Parker. |
| 2,424,885 | 7/1947 | Buist et al. |
| 2,740,743 | 4/1956 | Pace. |
| 2,764,565 | 9/1956 | Hoppe et al. |
| 2,858,296 | 10/1958 | Stilmar. |
| 2,929,800 | 3/1960 | Hill. |
| 3,093,525 | 6/1963 | Wilson et al. |

EARL M. BERGERT, *Primary Examiner.*

H. F. EPSTEIN, *Examiner.*